United States Patent
Bai et al.

(10) Patent No.: US 12,096,424 B2
(45) Date of Patent: Sep. 17, 2024

(54) METHOD AND DEVICE FOR TRANSMITTING HYBRID AUTOMATIC REPEAT REQUEST, NETWORK DEVICE AND TERMINAL

(71) Applicant: DATANG MOBILE COMMUNICATIONS EQUIPMENT CO., LTD., Beijing (CN)

(72) Inventors: Wei Bai, Beijing (CN); Xuejuan Gao, Beijing (CN); Tony Ekpenyong, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 525 days.

(21) Appl. No.: 17/289,708

(22) PCT Filed: Oct. 18, 2019

(86) PCT No.: PCT/CN2019/111906
§ 371 (c)(1),
(2) Date: Apr. 28, 2021

(87) PCT Pub. No.: WO2020/088276
PCT Pub. Date: May 7, 2020

(65) Prior Publication Data
US 2022/0007393 A1 Jan. 6, 2022

(30) Foreign Application Priority Data
Nov. 1, 2018 (CN) .......................... 201811296928.3

(51) Int. Cl.
*H04W 72/12* (2023.01)
*H04L 1/1812* (2023.01)
(Continued)

(52) U.S. Cl.
CPC ....... *H04W 72/1268* (2013.01); *H04L 1/1819* (2013.01); *H04L 1/1896* (2013.01); *H04W 72/23* (2023.01); *H04W 76/28* (2018.02)

(58) Field of Classification Search
CPC . H04W 72/1268; H04W 72/23; H04W 76/28; H04L 1/1819; H04L 1/1896; H04L 1/08
See application file for complete search history.

(56) References Cited

U.S. PATENT DOCUMENTS 11,196,495 B2 * 12/2021 Matsuda ................. H04L 27/26
2012/0076078 A1 3/2012 Han et al.
(Continued)

FOREIGN PATENT DOCUMENTS

| CN | 104080180 A | 10/2014 |
|---|---|---|
| CN | 105122932 A | 12/2015 |

(Continued)

OTHER PUBLICATIONS

Extended European Search Report from EP app. No. 19880025.2, dated Nov. 11, 2021, all pages.
(Continued)

*Primary Examiner* — John D Blanton
(74) *Attorney, Agent, or Firm* — Ladas & Parry, LLP (57) ABSTRACT

A method and a device for transmitting a hybrid automatic repeat request, a network device and a terminal are provided. The transmitting method includes: receiving a physical uplink shared channel (PUSCH) in an uplink grant-free transmission occasion; and transmitting an explicit hybrid automatic repeat request (HARQ) according to a reception result of the PUSCH, wherein a content of the explicit hybrid automatic repeat request (HARQ) includes at least one of: an acknowledgement (ACK), a negative acknowledgement (NACK), or a discontinuous transmission (DTX).

10 Claims, 2 Drawing Sheets

(51) Int. Cl.
*H04L 1/1867* (2023.01)
*H04W 72/1268* (2023.01)
*H04W 72/23* (2023.01)
*H04W 76/28* (2018.01)

(56) References Cited

U.S. PATENT DOCUMENTS

| | | | |
|---|---|---|---|
| 2012/0269103 A1 | 10/2012 | Papasakellariou et al. | |
| 2014/0269338 A1 | 9/2014 | Jung et al. | |
| 2016/0037552 A1 | 2/2016 | Svedman et al. | |
| 2016/0057753 A1 | 2/2016 | Yang et al. | |
| 2017/0273056 A1 | 9/2017 | Papasakellariou | |
| 2018/0167161 A1 | 6/2018 | Davydov | |
| 2018/0317213 A1* | 11/2018 | Islam | H04L 1/1614 |
| 2019/0174472 A1* | 6/2019 | Lee | H04L 1/1864 |
| 2019/0246412 A1 | 8/2019 | Noh et al. | |
| 2019/0379491 A1* | 12/2019 | Kilinc | H04L 1/1835 |
| 2020/0037314 A1* | 1/2020 | Xiong | H04L 1/1812 |
| 2020/0344835 A1* | 10/2020 | Wang | H04L 1/1896 |

FOREIGN PATENT DOCUMENTS

| | | |
|---|---|---|
| CN | 105191187 A | 12/2015 |
| CN | 106059716 A | 10/2016 |
| CN | 106559188 A | 4/2017 |
| WO | 2018/031770 A1 | 2/2018 |
| WO | 2018021783 A1 | 2/2018 |
| WO | 2018/073792 A1 | 4/2018 |

OTHER PUBLICATIONS

International Search Report from PCT/CN2019/111906, dated Jan. 17, 2020, with English translation from WIPO, all pages.
Written Opinion of the International Searching Authority from PCT/CN2019/111906, dated Jan. 17, 2020, with English translation from WIPO, all pages.
International Preliminary Report on Patentability from PCT/CN2019/111906, dated Apr. 27, 2021, with English translation from WIPO, all pages.
First Office Action and Search Report from CN app. No. 201811296928.3, dated Oct. 23, 2020, with English translation from Global Dossier, all pages.
Office action from corresponding EPO Patent Application No. 19880025.2 dated Sep. 8, 2023.
Panasonic: "URLLC enhanced grant-free transmission", 3GPP Draft; R1-1810731, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018 Sep. 28, 2018 (Sep. 28, 2018), XP051518135, Retrieved from the Internet: URL:http://www.3gpp.org/ftp/tsg%5Fran/WG1%5FRL1/TSGR1%5F94b/Docs/R1%2D1810731%2Ezip[retrieved on Sep. 28, 2018].

* cited by examiner

METHOD AND DEVICE FOR TRANSMITTING HYBRID AUTOMATIC REPEAT REQUEST, NETWORK DEVICE AND TERMINAL

CROSS-REFERENCE TO RELATED APPLICATIONS

This application is the U.S. national phase of PCT Application No. PCT/CN2019/111906 filed on Oct. 18, 2019, which claims a priority to Chinese Patent Application No. 201811296928.3 filed in China on Nov. 1, 2018, the disclosures of which are incorporated in their entireties by reference herein.

TECHNICAL FIELD

The present disclosure relates to the technical field of communications, and in particular to a method and a device for transmitting a hybrid automatic repeat request, a network device and a terminal.

BACKGROUND

With the development and change of mobile communication service requirements, many organizations such as 3GPP have begun to study new radio technology (5-th Generation New RAT, 5G NR) communication systems for future mobile communication systems. In the 5G NR system, an important requirement is low-latency and high-reliability communication, and transmission schemes such as ultra-reliable low latency communications (Ultra Reliable Low Latency Communications, URLLC) have emerged. The low-latency requirement alone or the high-reliability requirement alone is relatively easy to achieve. However, it is difficult to meet both the low-latency requirement and high-reliability requirement at the same time, which is usually achieved at the cost of high complexity.

For URLLC services, in NR standards, an uplink grant-free scheme may be supported to reduce an air interface transmission delay, and a repeated transmission scheme may be supported to increase reliability.

In the NR standards, a hybrid automatic repeat request (Hybrid Automatic Repeat Request, HARQ) feedback scheme includes: setting a timer on a UE side; if a reception of a physical uplink shared channel (Physical Uplink Shared Channel, PUSCH) fails; gNB transmitting a downlink control information (DCI) scheduling signaling for PUSCH retransmission before the timer expires, to instruct the UE to retransmit the PUSCH; and if the PUSCH is received correctly, the gNB may not provide any feedback, and when the timer expires, the UE may automatically consider that the PUSCH has been received correctly.

Figure 1:
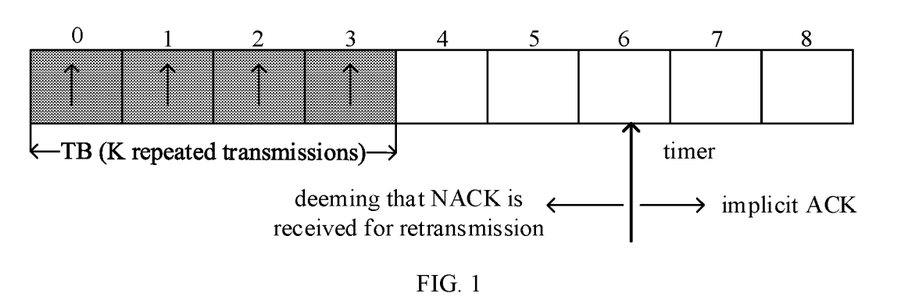
FIG. 1 is a schematic diagram of HARQ transmission in related technologies.

As shown in FIG. 1, the UE starts an internal timer immediately after completing a transmission of a transmission block TB (including K repeated transmissions). If the UE receives downlink control information (Downlink Control Information, DCI) for scheduling TB retransmission from the gNB before the timer expires, the UE considers that a NACK has been received, that is, the TB transmission has not been received successfully. If the UE does not receive the scheduled DCI for the TB retransmission from the gNB before the timer expires, the UE deems that an ACK has been received, that is, the TB transmission is received correctly.

If the UE transmits a PUSCH, but the gNB does not detect anything, that is, the gNB thinks that the UE has not transmitted a PUSCH, and this situation is referred to as miss-detection. In this case, the gNB would not have any HARQ feedback, and after the timer expires, the UE deems that the TB transmission has been received successfully, which may seriously affect the reliability and delay characteristics of URLLC services.

The disadvantage of the related technology is that HARQ feedback consumes a large amount of downlink control signaling resources, which results in a problem of insufficient downlink control signaling resources.

SUMMARY

Embodiments of the present disclosure provide a method and a device for transmitting a hybrid automatic repeat request, a network device, and a terminal, so as to solve the problem that HARQ feedback consumes many downlink control signaling resources.

In order to solve the above technical problem, the embodiments of the present disclosure provide the following technical solutions:

a method for transmitting a hybrid automatic repeat request, applied to a network device. The method includes:

receiving a physical uplink shared channel (PUSCH) in an uplink grant-free transmission occasion; and transmitting an explicit hybrid automatic repeat request (HARQ) according to a reception result of the PUSCH, where a content of the explicit hybrid automatic repeat request (HARQ) includes at least one of: an acknowledgement (ACK), a negative acknowledgement (NACK), or a discontinuous transmission (DTX).

The transmitting the explicit hybrid automatic repeat request (HARQ) according to the reception result of the PUSCH includes:

when the PUSCH is received and correctly detected, transmitting the explicit HARQ, where the content of the explicit HARQ is the acknowledgement (ACK); and when the PUSCH is not received, or the PUSCH is received but incorrectly detected, not transmitting the explicit HARQ.

The transmitting the explicit hybrid automatic repeat request (HARQ) according to the reception result of the PUSCH includes:

when the PUSCH is received and correctly detected, transmitting the explicit HARQ, where the content of the explicit HARQ is the acknowledgement (ACK);

when the PUSCH is not received, transmitting the explicit HARQ, where the content of the explicit HARQ is the discontinuous transmission (DTX); and when the PUSCH is received but incorrectly detected, not transmitting the explicit HARQ.

The transmitting the explicit hybrid automatic repeat request (HARQ) according to the reception result of the PUSCH includes:

when the PUSCH is received and correctly detected, not transmitting the explicit HARQ; and when the PUSCH is not received, or the PUSCH is received but incorrectly detected, transmitting the explicit HARQ, where the content of the explicit HARQ is the negative acknowledgement (NACK).

The transmitting the explicit hybrid automatic repeat request (HARQ) according to the reception result of the PUSCH includes:

when the PUSCH is received and correctly detected, not transmitting the explicit HARQ;

when or the PUSCH is received but incorrectly detected, transmitting the explicit HARQ, where the content of the explicit HARQ is the negative acknowledgement (NACK); and when the PUSCH is not received, transmitting the explicit HARQ, where the content of the explicit HARQ is the discontinuous transmission (DTX).

The transmitting the explicit hybrid automatic repeat request (HARQ) according to the reception result of the PUSCH includes:

when the PUSCH is received and correctly detected, transmitting the explicit HARQ, where the content of the explicit HARQ is the acknowledgement (ACK);

when the PUSCH is received but incorrectly detected, transmitting the explicit HARQ, where the content of the explicit HARQ is the negative acknowledgement (NACK); and when the PUSCH is not received, not transmitting the explicit HARQ.

Before receiving the physical uplink shared channel (PUSCH) in the uplink grant-free transmission occasion, the method further includes:

transmitting, to a terminal via a signaling, configuration information of whether to support transmission of the explicit HARQ.

The signaling includes one of: a broadcast signaling, a higher-layer signaling, or a layer 1 control signaling.

The transmitting the explicit HARQ includes:

transmitting an explicit HARQ for at least one terminal by using downlink control information (DCI); or transmitting an explicit HARQ for at least one terminal by using a sequence, where the explicit HARQ for each terminal corresponds to a transmission sequence that is subjected to cyclic shift.

The DCI includes: A bit information corresponding to the explicit HARQ of each terminal, and different states of the A bit information respectively indicate different explicit HARQ contents; or the DCI includes: indication information for performing PUSCH retransmission with a hybrid automatic repeat request identifier (HARQ ID) corresponding to the PUSCH, or for performing PUSCH retransmission with an optional hybrid automatic repeat request identifier (HARQ ID), in a case that the PUSCH retransmission is determined to be performed.

The transmitting the explicit hybrid automatic repeat request (HARQ) includes:

transmitting an explicit HARQ for at least one terminal in a predetermined transmission time.

The predetermined transmission time includes: a time interval between a start moment and an end moment, where the start moment is a moment when the network device completes receiving all repeated transmissions of the PUSCH, the end moment is a moment when a timer expires, and the timer is started when the network device completes receiving all the repeated transmissions of the PUSCH; or the predetermined transmission time includes: a time interval between a start moment and an end moment, where the start moment is a moment when the network device completes receiving one repeated transmission of the PUSCH, the end moment is a moment when a timer expires, and the timer is started when the network device completes receiving all repeated transmissions of the PUSCH.

An embodiment of the present disclosure further provides a method for transmitting a hybrid automatic repeat request, applied to a terminal. The method includes:

transmitting a physical uplink shared channel (PUSCH) in an uplink grant-free transmission occasion;

detecting an explicit hybrid automatic repeat request (HARQ) corresponding to the PUSCH to obtain a detection result, where the detection result includes at least one of: an acknowledgement (ACK), a negative acknowledgement (NACK), or a discontinuous transmission (DTX); and determining whether to retransmit the PUSCH according to the detection result.

The determining whether to retransmit the PUSCH according to the detection result includes:

when the explicit HARQ is detected, and a content of the explicit HARQ is the ACK, not retransmitting the PUSCH; or when the explicit HARQ is not detected before a timer of the terminal expires, retransmitting the PUSCH with a hybrid automatic repeat request identifier (HARQ ID) corresponding to the PUSCH, or retransmitting the PUSCH with an optional hybrid automatic repeat request identifier (HARQ ID).

The determining whether to retransmit the PUSCH according to the detection result includes:

when the explicit HARQ is received, and a content of the explicit HARQ is the ACK, not retransmitting the PUSCH; or when the explicit HARQ is received, and a content of the explicit HARQ is the DTX, retransmitting the PUSCH with an optional hybrid automatic repeat request identifier (HARQ ID); or when the explicit HARQ is not detected before a timer of the terminal expires, retransmitting the PUSCH with a hybrid automatic repeat request identifier (HARQ ID) corresponding to the PUSCH, or retransmitting the PUSCH with an optional hybrid automatic repeat request identifier (HARQ ID).

The determining whether to retransmit the PUSCH according to the detection result includes:

when the explicit HARQ is received, and a content of the explicit HARQ is the NACK, retransmitting the PUSCH with a hybrid automatic repeat request identifier (HARQ ID) corresponding to the PUSCH, or retransmitting the PUSCH with an optional hybrid automatic repeat request identifier (HARQ ID); or when the explicit HARQ is not detected before a timer of the terminal expires, not retransmitting the PUSCH.

The determining whether to retransmit the PUSCH according to the detection result includes:

when the explicit HARQ is received, and a content of the explicit HARQ is the NACK, retransmitting the PUSCH with a hybrid automatic repeat request identifier (HARQ ID) corresponding to the PUSCH, or retransmitting the PUSCH with an optional hybrid automatic repeat request identifier (HARQ ID); or when the explicit HARQ is received, and a content of the explicit HARQ is the DTX, retransmitting the PUSCH with an optional hybrid automatic repeat request identifier (HARQ ID); or when the explicit HARQ is not detected before a timer of the terminal expires, not retransmitting the PUSCH.

The determining whether to retransmit the PUSCH according to the detection result includes:

when the explicit HARQ is received, and a content of the explicit HARQ is the NACK, retransmitting the PUSCH with a hybrid automatic repeat request identifier (HARQ ID) corresponding to the PUSCH, or retransmitting the PUSCH with an optional hybrid automatic repeat request identifier (HARQ ID); or when the explicit HARQ is received, and a content of the explicit HARQ is the ACK, not retransmitting the PUSCH; or when the explicit HARQ is not detected before a timer of the terminal expires, retransmitting the PUSCH with an optional hybrid automatic repeat request identifier (HARQ ID).

The detecting the explicit hybrid automatic repeat request (HARQ) corresponding to the PUSCH to obtain the detection result includes:

receiving downlink control information (DCI) transmitted by a network device, and detecting, from the DCI, the explicit hybrid automatic repeat request (HARQ) corresponding to the PUSCH to obtain the detection result; or receiving a sequence transmitted by a network device, and detecting, from the sequence, the explicit hybrid automatic repeat request (HARQ) corresponding to the PUSCH to obtain the detection result, where an explicit HARQ for each terminal corresponds to a transmission sequence that is subjected to cyclic shift.

The DCI includes: A bit information corresponding to the explicit HARQ of each terminal, and different states of the A bit information respectively indicate different explicit HARQ contents; or the DCI includes: indication information for performing PUSCH retransmission with a hybrid automatic repeat request identifier (HARQ ID) corresponding to the PUSCH, or for performing PUSCH retransmission with an optional hybrid automatic repeat request identifier (HARQ ID), in a case that the PUSCH retransmission is determined to be performed.

The detecting the explicit hybrid automatic repeat request (HARQ) corresponding to the PUSCH includes:

receiving, in a predetermined transmission time, the explicit HARQ that is transmitted to the terminal.

The predetermined transmission time includes: a time interval between a start moment and an end moment, where the start moment is a moment when the network device completes receiving all repeated transmissions of the PUSCH, the end moment is a moment when a timer expires, and the timer is started when the network device completes receiving all the repeated transmissions of the PUSCH; or the predetermined transmission time includes: a time interval between a start moment and an end moment, where the start moment is a moment when the network device completes receiving one repeated transmission of the PUSCH, the end moment is a moment when a timer expires, and the timer is started when the network device completes receiving all repeated transmissions of the PUSCH.

Before transmitting the physical uplink shared channel (PUSCH) in the uplink grant-free transmission occasion, the method further includes: receiving a signaling; and determining, according to the signaling, whether to support a transmission of the explicit HARQ.

The signaling includes one of: a broadcast signaling, a higher-layer signaling, or a layer 1 control signaling.

An embodiment of the present disclosure further provides a network device, including: a transceiver configured to receive a physical uplink shared channel (PUSCH) in an uplink grant-free transmission occasion; and transmit an explicit hybrid automatic repeat request (HARQ) according to a reception result of the PUSCH, where a content of the explicit hybrid automatic repeat request (HARQ) includes at least one of: an acknowledgement (ACK), a negative acknowledgement (NACK), or a discontinuous transmission (DTX).

An embodiment of the present disclosure further provides a device for transmitting a hybrid automatic repeat request, including: a transmitting and receiving module configured to receive a physical uplink shared channel (PUSCH) in an uplink grant-free transmission occasion; and transmit an explicit hybrid automatic repeat request (HARQ) according to a reception result of the PUSCH, where a content of the explicit hybrid automatic repeat request (HARQ) includes at least one of: an acknowledgement (ACK), a negative acknowledgement (NACK), or a discontinuous transmission (DTX).

An embodiment of the present disclosure further provides a network device, including: a processor configured to perform following functions: receiving a physical uplink shared channel (PUSCH) in an uplink grant-free transmission occasion; and transmitting an explicit hybrid automatic repeat request (HARQ) according to a reception result of the PUSCH, where a content of the explicit hybrid automatic repeat request (HARQ) includes at least one of: an acknowledgement (ACK), a negative acknowledgement (NACK), or a discontinuous transmission (DTX).

An embodiment of the present disclosure further provides a terminal, including: a transceiver, configured to transmit a physical uplink shared channel (PUSCH) in an uplink grant-free transmission occasion; and a processor, configured to detect an explicit hybrid automatic repeat request (HARQ) corresponding to the PUSCH to obtain a detection result, where the detection result includes at least one of: an acknowledgement (ACK), a negative acknowledgement (NACK), or a discontinuous transmission (DTX); where the transceiver is configured to determine whether to retransmit the PUSCH according to the detection result.

An embodiment of the present disclosure further provides a device for transmitting a hybrid automatic repeat request, including: a transmitting and receiving module, configured to transmit a physical uplink shared channel (PUSCH) in an uplink grant-free transmission occasion; and a processing module, configured to detect an explicit hybrid automatic repeat request (HARQ) corresponding to the PUSCH to obtain a detection result, where the detection result includes at least one of: an acknowledgement (ACK), a negative acknowledgement (NACK), or a discontinuous transmission (DTX); where the transmitting and receiving module is configured to determine whether to retransmit the PUSCH according to the detection result.

An embodiment of the present disclosure further provides a terminal, including a processor configured to perform following functions: transmitting a physical uplink shared channel (PUSCH) in an uplink grant-free transmission occasion; detecting an explicit hybrid automatic repeat request (HARQ) corresponding to the PUSCH to obtain a detection result, where the detection result includes at least one of: an acknowledgement (ACK), a negative acknowledgement (NACK), or a discontinuous transmission (DTX); and determining whether to retransmit the PUSCH according to the detection result.

An embodiment of the present disclosure further provides a computer storage medium, including an instruction, which, when being executed on a computer, causes the computer to execute the above-mentioned method.

The beneficial effects of the embodiments of the present disclosure are as follows.

In the above-mentioned embodiment of the present disclosure, a physical uplink shared channel (PUSCH) is received in an uplink grant-free transmission occasion; and an explicit hybrid automatic repeat request (HARQ) is transmitted according to a reception result of the PUSCH. The problem that HARQ feedback consumes too much downlink control signaling resources can be solved.

BRIEF DESCRIPTION OF THE DRAWINGS

In order to explain technical solutions of embodiments of the present disclosure more clearly, the following will briefly introduce the drawings that need to be used in the description of the embodiments of the present disclosure. Obviously, the drawings in the following description are only some embodiments of the present disclosure. Those of ordinary skill in the art can also obtain other drawings based on these drawings without creative effort.

DETAILED DESCRIPTION

Hereinafter, exemplary embodiments of the present disclosure will be described in more detail with reference to the accompanying drawings. Although the drawings show exemplary embodiments of the present disclosure, it should be understood that the present disclosure can be implemented in various forms, which should not be limited by the embodiments set forth herein. On the contrary, these embodiments are provided to enable a more thorough understanding of the present disclosure and to fully convey the scope of the present disclosure to those skilled in the art.

Figure 2:
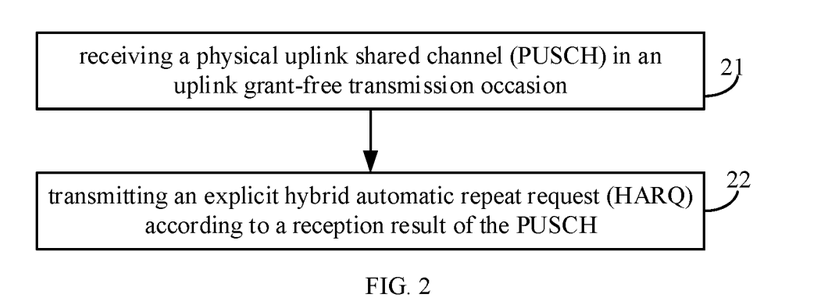
FIG. 2 is a flowchart of a method for transmitting a hybrid automatic repeat request on a network side according to an embodiment of the present disclosure.

As shown in FIG. 2, an embodiment of the present disclosure provides a method for transmitting a hybrid automatic repeat request, which is applied to a network device. The method includes:

Step 21: receiving a physical uplink shared channel (PUSCH) in an uplink grant-free transmission occasion.

The network device herein may be a base station. The base station transmits the configuration information of uplink grant-free transmission to the UE. If the transmission corresponds to Type 2 uplink grant-free transmission, the base station may also transmit activation DCI. According to the configuration information of uplink grant-free transmission or an activation signaling of the uplink grant-free transmission, the physical uplink shared channel (PUSCH) is received in the uplink grant-free transmission occasion.

Step 22: transmitting an explicit hybrid automatic repeat request (HARQ) according to a reception result of the PUSCH, where a content of the explicit hybrid automatic repeat request (HARQ) includes at least one of: an acknowledgement (ACK), a negative acknowledgement (NACK), or a discontinuous transmission (DTX).

A specific implementation manner of step 22 is as follows.

Manner 221, feeding back only the explicit ACK:
when the PUSCH is received and correctly detected, transmitting the explicit HARQ, where the content of the explicit HARQ is the ACK; and
when the PUSCH is not received, or the PUSCH is received but incorrectly detected, not transmitting the explicit HARQ.

Manner 222, feeding back both the explicit ACK and DTX:
when the PUSCH is received and correctly detected, transmitting the explicit HARQ, where the content of the explicit HARQ is the ACK;
when the PUSCH is not received, transmitting the explicit HARQ, where the content of the explicit HARQ is the DTX; and
when the PUSCH is received but incorrectly detected, not transmitting the explicit HARQ.

Manner 223, feeding back only the explicit NACK:
when the PUSCH is received and correctly detected, not transmitting the explicit HARQ; and
when the PUSCH is not received, or the PUSCH is received but incorrectly detected, transmitting the explicit HARQ, where the content of the explicit HARQ is the NACK.

Manner 224, feeding back both the explicit NACK and DTX:
when the PUSCH is received and correctly detected, not transmitting the explicit HARQ;
when the PUSCH is received but incorrectly detected, transmitting the explicit HARQ, where the content of the explicit HARQ is the NACK; and
when the PUSCH is not received, transmitting the explicit HARQ, where the content of the explicit HARQ is the DTX.

Manner 225, feeding back both the explicit ACK and NACK:
when the PUSCH is received and correctly detected, transmitting the explicit HARQ, where the content of the explicit HARQ is the ACK;
when the PUSCH is received but incorrectly detected, transmitting the explicit HARQ, where the content of the explicit HARQ is the NACK; and
when the PUSCH is not received, not transmitting the explicit HARQ.

In the foregoing embodiments of the present disclosure, before step 21, the method may further include step 20: determining whether to support transmission of the explicit HARQ, and transmitting, to a terminal via a signaling, configuration information of whether to support the explicit HARQ transmission. The signaling includes one of: a broadcast signaling, a higher-layer signaling, or a layer 1 control signaling.

In the foregoing embodiments of the present disclosure, in the specific implementation manners 221 to 225 of step 22, the transmitting the explicit HARQ may include:
1) transmitting an explicit HARQ for at least one terminal by using downlink control information (DCI), where an explicit HARQ of each terminal corresponds to A bit information, and different states of the A bit information respectively indicate different explicit HARQ contents, A being an integer greater than or equal to 1.

In a case that A=1, a first state of the A-bit information indicates acknowledgement (ACK) or negative acknowledgement (NACK), and a second state indicates discontinuous transmission (DTX);

For example, if A=1, corresponding to the specific implementation manner 221 of step 22, "1" of the 1-bit information indicates ACK.

For example, if A=1, corresponding to the specific implementation manner 222 of step 22, value "1" of the 1-bit information indicates ACK, and value "0" in the 1-bit information indicates DTX.

For example, if A=1, corresponding to the specific implementation manner 223 of step 22, value "1" of the 1-bit information indicates NACK.

For example, if A=1, corresponding to the specific implementation manner 224 of step 22, value "1" of the 1-bit information indicates NACK, and value "0" of the 1-bit information indicates DTX.

For example, if A=1, corresponding to the specific implementation manner 225 of step 22, value "1" of the 1-bit information indicates ACK, and value "0" of the 1-bit information indicates NACK.

In a case that A>1, for example, a first bit of 2-bit information indicates to perform explicit HARQ retransmission, a first state of a second bit indicates to perform PUSCH retransmission with a hybrid automatic repeat request identifier (HARQ ID) corresponding to the PUSCH, and a second state of a second bit indicates to perform PUSCH retransmission with an arbitrary hybrid automatic repeat request identifier (HARQ ID). For example, 10 indicates the first state herein, and 11 indicates the second state herein.

In case that the DCI includes explicit HARQ of multiple terminals, a corresponding relationship between each terminal and the A bit information is configured in advance.

Of course, the DCI may also include: indication information for performing PUSCH retransmission with a HARQ ID corresponding to the PUSCH, or for performing PUSCH retransmission with an optional HARQ ID, in a case that the PUSCH retransmission is determined to be performed. That is, a DCI signaling indicates that the PUSCH is retransmitted with the HARQ ID corresponding to the PUSCH, or with the optional HARQ ID, in a case that the PUSCH retransmission is determined to be performed.

In the foregoing embodiments of the present disclosure, in the specific implementation manners 221 to 225 of step 22, the transmitting the explicit HARQ may also include:

2) transmitting an explicit HARQ for at least one terminal by using a sequence, where the explicit HARQ for each terminal corresponds to a transmission sequence that is subjected to cyclic shift.

When a transmission sequence corresponding to multiple terminals are transmitted on a same time-frequency resource, different terminals correspond to different cyclic shifts, and a correspondence between each terminal and the cyclic shift is configured in advance.

In the above-mentioned embodiments of the present disclosure, the transmitting the explicit HARQ may include: transmitting an explicit HARQ for at least one terminal in a predetermined transmission time. In a specific implementation, the explicit HARQ of the at least one terminal may be transmitted according to a predefined or pre-configured transmission occasion within the predetermined transmission time.

The predetermined transmission time includes: a time interval between a start moment and an end moment, where the start moment is a moment when the network device completes receiving all repeated transmissions of the PUSCH, the end moment is a moment when a timer expires, and the timer is started when the network device completes receiving all the repeated transmissions of the PUSCH. For example, if a system does not support an early termination function, a position where a base station completes receiving all the repeated transmissions of the PUSCH is the earliest time to transmit the explicit HARQ, a timer is stated at the same time, and the latest time to transmit explicit HARQ is determined when the timer expires.

Alternatively, the predetermined transmission time includes: a time interval between a start moment and an end moment, where the start moment is a moment when the network device completes receiving one repeated transmission of the PUSCH, the end moment is a moment when a timer expires, and the timer is started when the network device completes receiving all repeated transmissions of the PUSCH. For example, if a system supports an early termination function, a position where a base station completes receiving one repeated transmission of the PUSCH is the earliest time to transmit the explicit HARQ, a timer is stated when the base station completes receiving all repeated transmissions of the PUSCH, and the latest time to transmit explicit HARQ is determined when the timer expires.

A specific implementation process of the above method is described below in conjunction with a specific implementation example.

An implementation process includes:

step 1: a base station (that is, the above-mentioned network device) transmitting configuration information of an uplink grant-free transmission transmitted to a UE, where if it corresponds to a Type 2 uplink grant-free transmission, the base station further needs to transmit activation DCI;

step 2: the base station receiving the PUSCH on a configured resource; and step 3: the base station sequentially determining which one should be selected from the following five behaviors.

Figure 3:
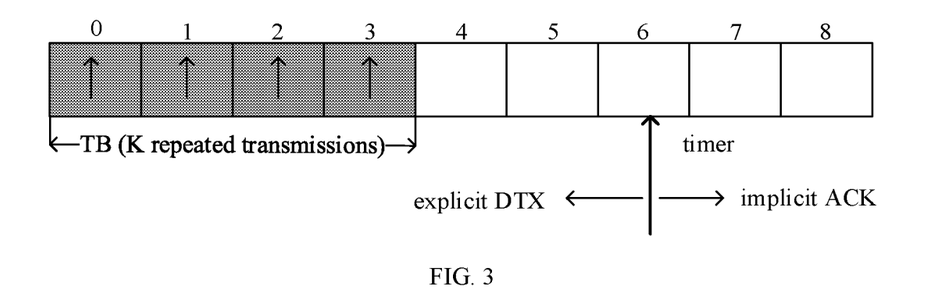
FIG. 3 is a schematic diagram of HARQ transmission of the present disclosure.

If the system supports an early termination function, the base station may start to transmit downlink control signaling including PDCCH and explicit HARQ, after having received one repeated transmission ($0^{th}$ transmission in a TB as shown in FIG. 3).

If the system does not support an early termination function, the base station may start to transmit downlink control signaling, after completing receiving all repeated transmissions (at the end of a TB in FIG. 3, that is, the third transmission). When completing receiving all repeated transmissions, the base station starts a timer. After the timer expires, the base station cannot transmit downlink control signaling for the PUSCH.

(i) After receiving part or all of the repeated transmissions, the base station transmits PDCCH to the UE to schedule a new PUSCH transmission with the same HARQ ID, if the PUSCH is correctly decoded.

(ii) After receiving part or all of the repeated transmissions, the base station transmits PDCCH to the UE to schedule a retransmission of the PUSCH with the same HARQ ID, if the PUSCH is incorrectly decoded.

(iii) After receiving part or all of the repeated transmissions, according to the reception result of the PUSCH, the base station does not transmit PDCCH or explicit HARQ.

(iv) After receiving part or all of the repeated transmissions, the base station transmits NACK downlink control signaling to the UE.

(v) When the base station does not detect any PUSCH signal of the configured UE, the base station transmits DTX downlink control signaling to the UE.

Another implementation process includes:

step 1: a base station transmitting configuration information of an uplink grant-free transmission transmitted to a UE, where if it corresponds to a Type 2 uplink grant-free transmission, the base station further needs to transmit activation DCI;

step 2: the base station receiving the PUSCH on a configured resource; and step 3: the base station sequentially determining which one should be selected from the following four behaviors.

When completing receiving one repeated transmission (the $0^{th}$ transmission in a TB in FIG. 4), the base station may start to transmit downlink control signaling, which includes PDCCH and explicit HARQ.

Figure 4:
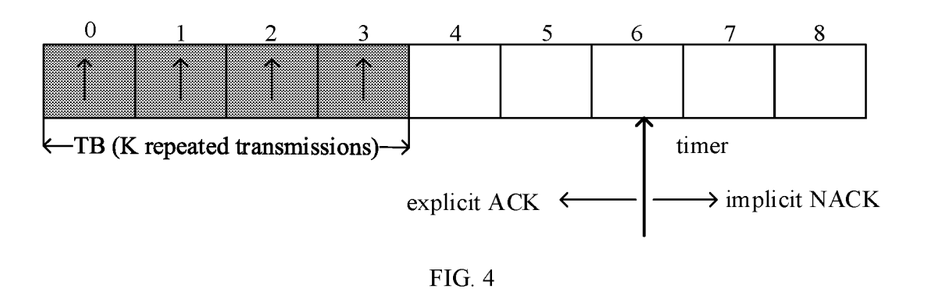
FIG. 4 is another schematic diagram of HARQ transmission of the present disclosure.

The base station starts a timer when completing receiving all the repeated transmissions (at the end of a TB in FIG. 4, that is, the third transmission). After the timer expires, the base station cannot transmit downlink control signaling for the PUSCH.

(i) After receiving part or all of the repeated transmissions, the base station transmits PDCCH to the UE to schedule a new PUSCH transmission with the same HARQ ID.

(ii) After receiving part or all of the repeated transmissions, the base station transmits PDCCH to the UE to schedule a retransmission of the PUSCH with the same HARQ ID.

(iii) After receiving part or all of the repeated transmissions, the base station transmits ACK information to the UE.

(iv) After receiving part or all of the repeated transmissions, the base station does not take any action.

In the above-mentioned embodiments of the present disclosure, by transmitting an explicit HARQ, a problem that HARQ feedback consumes a large amount of downlink control signaling resources can be solved, on the premise of solving the miss-detection.

Figure 5:
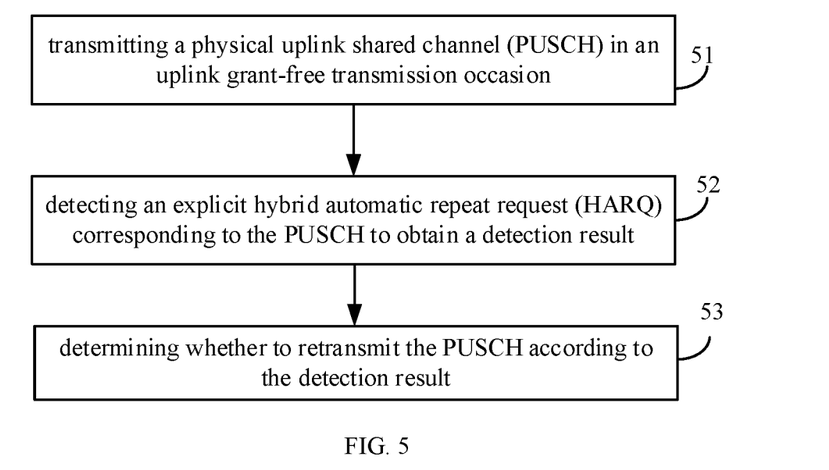
FIG. 5 is a flowchart of a method for transmitting a hybrid automatic repeat request on a terminal side according to an embodiment of the present disclosure.

As shown in FIG. 5, an embodiment of the present disclosure also provides a method for transmitting a hybrid automatic repeat request, which is applied to a terminal, and the method includes:

step 51: transmitting a physical uplink shared channel (PUSCH) in an uplink grant-free transmission occasion, where, specifically, configuration information of the uplink grant-free transmission or activation signaling of the uplink grant-free transmission is received; the PUSCH is transmitted in the uplink grant-free transmission occasion according to the configuration information of the uplink grant-free transmission or the activation signaling of the uplink grant-free transmission;

step 52: detecting an explicit hybrid automatic repeat request (HARQ) corresponding to the PUSCH to obtain a detection result, where the detection result includes at least one of: an acknowledgement (ACK), a negative acknowledgement (NACK), or a discontinuous transmission (DTX); and step 53: determining whether to retransmit the PUSCH according to the detection result.

A specific implementation manner of step 53 is as follows.

Manner 531, feeding back only the explicit ACK:

when the explicit HARQ is detected, and a content of the explicit HARQ is the ACK, considering that the PUSCH has been successfully transmitted, and not retransmitting the PUSCH; or when the explicit HARQ is not detected before a timer of the terminal expires, determining to retransmit the PUSCH, specifically, with a HARQ ID corresponding to the PUSCH or an arbitrary HARQ ID.

Manner 532, feeding back both the explicit ACK and DTX:

when the explicit HARQ is received, and a content of the explicit HARQ is the ACK, not retransmitting the PUSCH; or when the explicit HARQ is received, and a content of the explicit HARQ is the DTX, retransmitting the PUSCH with an optional HARQ ID; or when the explicit HARQ is not detected before a timer of the terminal expires, retransmitting the PUSCH with a HARQ ID corresponding to the PUSCH, or retransmitting the PUSCH with an optional HARQ ID.

Manner 533, feeding back only the explicit NACK:

when the explicit HARQ is received, and a content of the explicit HARQ is the NACK, retransmitting the PUSCH with a HARQ ID corresponding to the PUSCH, or retransmitting the PUSCH with an optional HARQ ID; or when the explicit HARQ is not detected before a timer of the terminal expires, not retransmitting the PUSCH.

Manner 534, feeding back both the explicit NACK and DTX:

when the explicit HARQ is received, and a content of the explicit HARQ is the NACK, retransmitting the PUSCH with a HARQ ID corresponding to the PUSCH, or retransmitting the PUSCH with an optional HARQ ID; or when the explicit HARQ is received, and a content of the explicit HARQ is the DTX, retransmitting the PUSCH with an optional HARQ ID; or when the explicit HARQ is not detected before a timer of the terminal expires, not retransmitting the PUSCH.

Manner 535, feeding back both the explicit ACK and NACK:

when the explicit HARQ is received, and a content of the explicit HARQ is the NACK, retransmitting the PUSCH with a HARQ ID corresponding to the PUSCH, or retransmitting the PUSCH with an optional HARQ ID; or when the explicit HARQ is received, and a content of the explicit HARQ is the ACK, not retransmitting the PUSCH; or when the explicit HARQ is not detected before a timer of the terminal expires, retransmitting the PUSCH with an optional HARQ ID.

In the foregoing embodiments of the present disclosure, step 52 may include:

step 521: receiving downlink control information (DCI) transmitted by a network device, and detecting, from the DCI, the explicit hybrid automatic repeat request (HARQ) corresponding to the PUSCH to obtain the detection result; or step 522: receiving a sequence transmitted by a network device, and detecting, from the sequence, the explicit hybrid automatic repeat request (HARQ) corresponding to the PUSCH to obtain the detection result, where an explicit HARQ for each terminal corresponds to a transmission sequence that is subjected to cyclic shift.

The DCI includes: A bit information corresponding to the explicit HARQ of each terminal, and different states of the A bit information respectively indicate different explicit HARQ contents.

For example, if A=1, corresponding to the specific implementation manner 221 of step 22, value "1" of the 1-bit information indicates ACK.

For example, if A=1, corresponding to the specific implementation manner 222 of step 22, value "1" of the 1-bit information indicates ACK, and value "0" of the 1-bit information indicates DTX.

For example, if A=1, corresponding to the specific implementation manner 223 of step 22, value "1" of the 1-bit information indicates NACK.

For example, if A=1, corresponding to the specific implementation manner 224 of step 22, value "1" of the 1-bit information indicates NACK, and value "0" of the 1-bit information indicates DTX.

For example, if A=1, corresponding to the specific implementation manner 225 of step 22, value "1" of the 1-bit information indicates ACK, and value "0" of the 1-bit information indicates NACK.

In a case that A>1, for example, a first bit of 2-bit information indicates to perform explicit HARQ retransmission, a first state of a second bit indicates to perform PUSCH retransmission with a hybrid automatic repeat request identifier (HARQ ID) corresponding to the PUSCH, and a second state of a second bit indicates to perform PUSCH retransmission with an arbitrary hybrid automatic repeat request identifier (HARQ ID). For example, 10 indicates the first state herein, and 11 indicates the second state herein.

In case that the DCI includes explicit HARQ of multiple terminals, a corresponding relationship between each terminal and the A bit information is configured in advance.

Of course, the DCI may also include: indication information for performing PUSCH retransmission with a HARQ ID corresponding to the PUSCH, or for performing PUSCH retransmission with an optional HARQ ID, in a case that the PUSCH retransmission is determined to be performed. That is, a DCI signaling indicates that the PUSCH is retransmitted with the HARQ ID corresponding to the PUSCH, or with the optional HARQ ID, in a case that the PUSCH retransmission is determined to be performed.

In step 522, the detecting the explicit hybrid automatic repeat request (HARQ) corresponding to the PUSCH includes: receiving, in a predetermined transmission time, the explicit HARQ that is transmitted to the terminal. In a specific implementation, the terminal may receive the explicit HARQ transmitted to the terminal according to a predefined or pre-configured transmission occasion in the predetermined transmission time.

The predetermined transmission time includes: a time interval between a start moment and an end moment, where the start moment is a moment when the network device completes receiving all repeated transmissions of the PUSCH, the end moment is a moment when a timer expires, and the timer is started when the network device completes receiving all the repeated transmissions of the PUSCH; or the predetermined transmission time includes: a time interval between a start moment and an end moment, where the start moment is a moment when the network device completes receiving one repeated transmission of the PUSCH, the end moment is a moment when a timer expires, and the timer is started when the network device completes receiving all repeated transmissions of the PUSCH.

In the above-mentioned embodiments of the present disclosure, before transmitting the physical uplink shared channel (PUSCH) in the uplink grant-free transmission occasion, the method may further include step 50: receiving a signaling; and determining, according to the signaling, whether to support a transmission of the explicit HARQ. The signaling includes one of: a broadcast signaling, a higher-layer signaling, or a layer 1 control signaling.

As shown in FIG. 3, an implementation process of the foregoing embodiments is as follows:

step 1: a UE receives configuration information of an uplink grant-free transmission transmitted by a base station, where if it corresponds to a Type 2 uplink grant-free transmission, the UE needs to transmit activation DCI to initiate the uplink grant-free transmission;

step 2: the UE transmits the PUSCH on a configured resource, as shown in the figures, K (K=4) repeated transmissions are performed on a slot/mini-slot;

step 3: if a system supports an early termination function, the UE needs to start monitoring whether there is downlink control signaling about the PUSCH after one repeated transmission, and if the system does not support the early termination function, the UE needs to start monitoring whether there is downlink control signaling about the PUSCH after K repeated transmissions (i.e., one TB, the TB is a transport block);

step 4: the UE starts a timer after the K repeated transmissions are completed, and after the timer expires, the UE stops monitoring whether there is downlink control signaling of the PUSCH;

step 5: if the UE monitors that a PDCCH schedules a new TB with the HARQ ID corresponding to the PUSCH, then the UE terminates its current repeated transmission and transmits the new TB according to information of the PDCCH;

if the UE monitors a PDCCH that schedules a retransmission with the HARQ ID corresponding to the PUSCH, then the UE terminates its current repeated transmission and retransmits the TB according to information about the PDCCH;

if the UE monitors that there is NACK information in the downlink control signaling, the UE terminates its current repeated transmission and retransmits the TB using a new HARQ ID;

if the UE monitors that there is DTX information in the downlink control signaling, the UE terminates its current repeated transmission and retransmits the TB using a new HARQ ID;

when the UE monitors the downlink control signaling, the UE stops the timer;

step 6: after the timer expires, the UE deems that the PUSCH has been received correctly.

As shown in FIG. 4, another implementation process of the foregoing embodiments is as follows.

Step 1: a new field is added in RRC configuration signaling (Configured Grant Config), such as HARQ-explicit, which is used to indicate whether the base station will transmit explicit HARQ information to a UE; or in activation signaling DCI, a bit is added, or a definition of an existing bit is modified, for example, redefining the highest bit of a field named HARQ process number in the activation signaling DCI to indicate whether the base station is to transmit explicit HARQ information to the UE.

A UE receives configuration information of an uplink grant-free transmission transmitted by a base station, where if it corresponds to a Type 2 uplink grant-free transmission, the UE needs to transmit activation DCI to start the uplink grant-free transmission.

Step 2: the UE performs K repeated transmissions of the PUSCH on a configured resource.

Step 3: if a system supports an early termination function, the UE needs to start monitoring whether there is downlink control signaling about the PUSCH after one repeated transmission, and if it is definite that the system does not support the early termination function, the UE needs to start monitoring whether there is downlink control signaling about the PUSCH after the K repeated transmissions.

Step 4: the UE starts a timer after the K repeated transmissions are completed, and after the timer expires, the UE stops monitoring whether there is downlink control signaling about the PUSCH.

Step 5: if the UE monitors that a PDCCH schedules a new TB with the HARQ ID, then the UE stops its current repeated transmission and transmits the new TB according to information about the PDCCH;

if the UE monitors that the PDCCH schedules a retransmission with the same HARQ ID, then the UE stops its current repeated transmission and retransmits the TB according to information about the PDCCH;

if the UE monitors that there is ACK information in the downlink control signaling, the UE stops its current repeated transmission and may continue to transmit a new TB. When the UE detects the downlink control signaling, the UE stops the timer.

Step 6: after the timer expires, the UE deems that the PUSCH has not been received correctly, and may perform retransmission using the same HARQ ID or a new HARQ ID.

In the above-mentioned embodiment of the present disclosure, after a UE receives a downlink control signaling from a base station, indicating that a PUSCH is not correctly or correctly received, the UE performs PUSCH retransmission using a new HARQ ID. Under the premise of solving the miss-detection, the problem that HARQ feedback consumes too much downlink control signaling resources can be solved.

Figure 6:
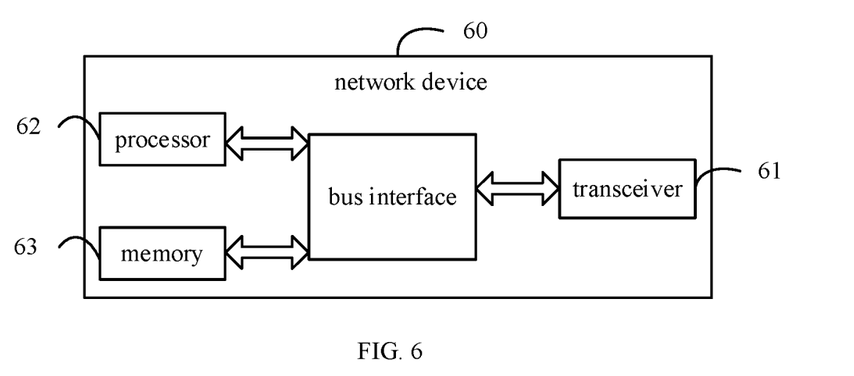
FIG. 6 is a schematic diagram of an architecture of a network device of the present disclosure.

As shown in FIG. 6, an embodiment of the present disclosure also provides a network device 60, which includes: a transceiver 61 configured to receive a physical uplink shared channel (PUSCH) in an uplink grant-free transmission occasion; and transmit an explicit hybrid automatic repeat request (HARQ) according to a reception result of the PUSCH, where a content of the explicit hybrid automatic repeat request (HARQ) includes at least one of: an acknowledgement (ACK), a negative acknowledgement (NACK), or a discontinuous transmission (DTX).

When receiving the PUSCH in the uplink grant-free transmission occasion, the transceiver 61 is specifically configured to receive the PUSCH in the uplink grant-free transmission occasion according to configuration information of an uplink grant-free transmission or activation signaling of an uplink grant-free transmission.

When the transceiver 61 transmits the HARQ according to the reception result of the PUSCH, it is specifically configured to: when the PUSCH is received and correctly detected, transmit the explicit HARQ, where the content of the explicit HARQ is the acknowledgement (ACK); and when the PUSCH is not received, or the PUSCH is received but incorrectly detected, not transmit the explicit HARQ.

When the transceiver 61 transmits the HARQ according to the reception result of the PUSCH, it is specifically configured to: when the PUSCH is received and correctly detected, transmit the explicit HARQ, where the content of the explicit HARQ is the acknowledgement (ACK); when the PUSCH is not received, transmit the explicit HARQ, where the content of the explicit HARQ is the discontinuous transmission (DTX); and when the PUSCH is received but incorrectly detected, not transmit the explicit HARQ.

When the transceiver 61 transmits the HARQ according to the reception result of the PUSCH, it is specifically configured to: when the PUSCH is received and correctly detected, not transmit the explicit HARQ; and when the PUSCH is not received, or the PUSCH is received but incorrectly detected, transmit the explicit HARQ, where the content of the explicit HARQ is the negative acknowledgement (NACK).

When the transceiver 61 transmits the HARQ according to the reception result of the PUSCH, it is specifically configured to: when the PUSCH is received and correctly detected, not transmit the explicit HARQ; when the PUSCH is not received, or the PUSCH is received but incorrectly detected, transmit the explicit HARQ, where the content of the explicit HARQ is the negative acknowledgement (NACK); and when the PUSCH is not received, transmit the explicit HARQ, where the content of the explicit HARQ is the discontinuous transmission (DTX).

When the transceiver 61 transmits the HARQ according to the reception result of the PUSCH, it is specifically configured to: when the PUSCH is received and correctly detected, transmit the explicit HARQ, where the content of the explicit HARQ is the acknowledgement (ACK); when the PUSCH is received but incorrectly detected, transmit the explicit HARQ, where the content of the explicit HARQ is the negative acknowledgement (NACK); and when the PUSCH is not received, not transmit the explicit HARQ.

Before receiving the physical uplink shared channel (PUSCH) in the uplink grant-free transmission occasion, the transceiver is further configured to transmit, to a terminal via a signaling, configuration information of whether to support transmission of the explicit HARQ.

The signaling includes one of: a broadcast signaling, a higher-layer signaling, or a layer 1 control signaling.

The transmitting the explicit HARQ includes: transmitting an explicit HARQ for at least one terminal by using downlink control information (DCI); or transmitting an explicit HARQ for at least one terminal by using a sequence, where the explicit HARQ for each terminal corresponds to a transmission sequence that is subjected to cyclic shift.

The DCI includes: A bit information corresponding to the explicit HARQ of each terminal, and different states of the A bit information respectively indicate different explicit HARQ contents; or the DCI includes: indication information for performing PUSCH retransmission with a hybrid automatic repeat request identifier (HARQ ID) corresponding to the PUSCH, or for performing PUSCH retransmission with an optional hybrid automatic repeat request identifier (HARQ ID), in a case that the PUSCH retransmission is determined to be performed.

When a transmission sequence corresponding to multiple terminals are transmitted on a same time-frequency resource, different terminals correspond to different cyclic shifts, and a correspondence between the terminals and the cyclic shifts is configured in advance.

An explicit HARQ for at least one terminal is transmitted in a predetermined transmission time.

The predetermined transmission time includes: a time interval between a start moment and an end moment, where the start moment is a moment when the network device completes receiving all repeated transmissions of the PUSCH, the end moment is a moment when a timer expires, and the timer is started when the network device completes receiving all the repeated transmissions of the PUSCH; or the predetermined transmission time includes: a time interval between a start moment and an end moment, where the start moment is a moment when the network device completes receiving one repeated transmission of the PUSCH, the end moment is a moment when a timer expires, and the timer is started when the network device completes receiving all repeated transmissions of the PUSCH.

It should be noted that the network device may be a base station, and the network device is a device corresponding to the above method shown in FIG. 2. All implementations in the embodiments of the method shown in FIG. 2 are applicable to the embodiments of the network device, and the same technical effects can also be achieved. The network device 60 may further include: a processor 62, a memory 63, etc. The transceiver 61 and the processor 62 are communicatively connected through a bus interface, the transceiver 61 and the memory 63 are communicatively connected through a bus interface, and the memory 63 and the processor 62 may also be communicatively connected via bus interface. Functions of the processor 62 may be implemented by the transceiver 61, and functions of the transceiver 61 may also be implemented by the processor 62.

An embodiment of the present disclosure also provides a device for transmitting a hybrid automatic repeat request, which includes: a transmitting and receiving module configured to receive a physical uplink shared channel (PUSCH) in an uplink grant-free transmission occasion; and transmit an explicit hybrid automatic repeat request (HARQ) according to a reception result of the PUSCH, where a content of the explicit hybrid automatic repeat request (HARQ) includes at least one of: an acknowledgement (ACK), a negative acknowledgement (NACK), or a discontinuous transmission (DTX).

The device is a device corresponding to the above method shown in FIG. 2, and all the implementation manners in the embodiments of the method shown in FIG. 2 are applicable to the embodiments of the network device, and the same technical effects can also be achieved.

An embodiment of the present disclosure also provides a network device, including: a processor configured to perform the following functions: receiving a physical uplink shared channel (PUSCH) in an uplink grant-free transmission occasion; and transmitting an explicit hybrid automatic repeat request (HARQ) according to a reception result of the PUSCH, where a content of the explicit hybrid automatic repeat request (HARQ) includes at least one of: an acknowledgement (ACK), a negative acknowledgement (NACK), or a discontinuous transmission (DTX). The device is a device corresponding to the above method shown in FIG. 2, and all the implementation manners in the embodiments of the method shown in FIG. 2 are applicable to the embodiments of the device, and the same technical effects can also be achieved.

Figure 7:
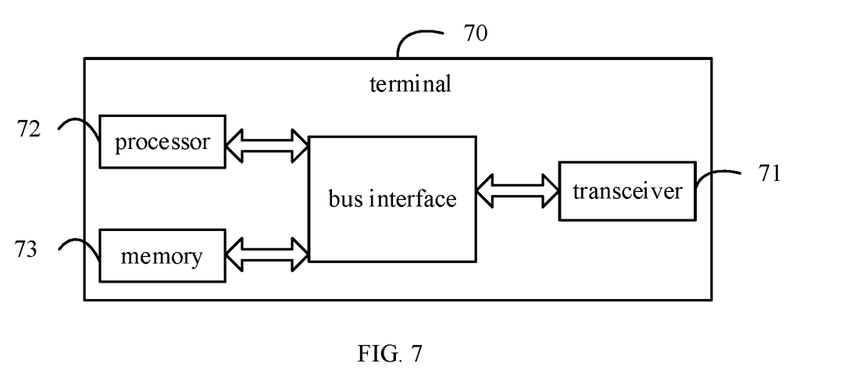
FIG. 7 is a schematic diagram of an architecture of a terminal of the present disclosure.

An embodiment of the present disclosure further provides a terminal 70, including: a transceiver 71 configured to transmit a physical uplink shared channel (PUSCH) in an uplink grant-free transmission occasion; and a processor 72 configured to detect the explicit hybrid automatic repeat request (HARQ) corresponding to the PUSCH to obtain a detection result; the detection result includes at least one of an acknowledgement (ACK), a non-acknowledgement NACK, and a discontinuous transmission DTX. The transceiver 71 is configured to determine whether to perform PUSCH retransmission according to the detection result.

When the transceiver 71 transmits the physical uplink shared channel (PUSCH) in the uplink grant-free transmission occasion, it is specifically configured to: receive configuration information or activation signaling of an uplink grant-free transmission; and transmit the physical uplink shared channel (PUSCH) in the uplink grant-free transmission occasion, according to the configuration information or activation signaling of the uplink grant-free transmission.

When determining whether to retransmit the PUSCH according to the detection result, the transceiver 71 is specifically configured to: when the explicit HARQ is detected, and a content of the explicit HARQ is the ACK, not retransmit the PUSCH; or when the explicit HARQ is not detected before a timer of the terminal expires, retransmit the PUSCH with a hybrid automatic repeat request identifier (HARQ ID) corresponding to the PUSCH, or retransmit the PUSCH with an optional hybrid automatic repeat request identifier (HARQ ID).

When determining whether to retransmit the PUSCH according to the detection result, the transceiver 71 is specifically configured to: when the explicit HARQ is received, and a content of the explicit HARQ is the ACK, not retransmit the PUSCH; or when the explicit HARQ is received, and a content of the explicit HARQ is the DTX, retransmit the PUSCH with an optional hybrid automatic repeat request identifier (HARQ ID); or when the explicit HARQ is not detected before a timer of the terminal expires, retransmit the PUSCH with a hybrid automatic repeat request identifier (HARQ ID) corresponding to the PUSCH, or retransmit the PUSCH with an optional hybrid automatic repeat request identifier (HARQ ID).

When determining whether to retransmit the PUSCH according to the detection result, the transceiver 71 is specifically configured to: when the explicit HARQ is received, and a content of the explicit HARQ is the NACK, retransmit the PUSCH with a hybrid automatic repeat request identifier (HARQ ID) corresponding to the PUSCH, or retransmit the PUSCH with an optional hybrid automatic repeat request identifier (HARQ ID); or when the explicit HARQ is not detected before a timer of the terminal expires, not retransmit the PUSCH.

When determining whether to retransmit the PUSCH according to the detection result, the transceiver 71 is specifically configured to: when the explicit HARQ is received, and a content of the explicit HARQ is the NACK, retransmit the PUSCH with a hybrid automatic repeat request identifier (HARQ ID) corresponding to the PUSCH, or retransmit the PUSCH with an optional hybrid automatic repeat request identifier (HARQ ID); or when the explicit HARQ is received, and a content of the explicit HARQ is the DTX, retransmit the PUSCH with an optional hybrid automatic repeat request identifier (HARQ ID); or when the explicit HARQ is not detected before a timer of the terminal expires, not retransmit the PUSCH.

When determining whether to retransmit the PUSCH according to the detection result, the transceiver 71 is specifically configured to: when the explicit HARQ is received, and a content of the explicit HARQ is the NACK, retransmit the PUSCH with a hybrid automatic repeat request identifier (HARQ ID) corresponding to the PUSCH, or retransmit the PUSCH with an optional hybrid automatic repeat request identifier (HARQ ID); or when the explicit HARQ is received, and a content of the explicit HARQ is the ACK, not retransmit the PUSCH; or when the explicit HARQ is not detected before a timer of the terminal expires, retransmit the PUSCH with an optional hybrid automatic repeat request identifier (HARQ ID).

The transceiver 71 is specifically configured to detect the explicit hybrid automatic repeat request (HARQ) corresponding to the PUSCH to obtain the detection result; and the processor 72 receives downlink control information (DCI) transmitted by a network device, and detects, from the DCI, the explicit hybrid automatic repeat request (HARQ) corresponding to the PUSCH to obtain the detection result; or the transceiver 71 is specifically configured to detect the explicit hybrid automatic repeat request (HARQ) corresponding to the PUSCH to obtain the detection result; and the processor 72 receives a sequence transmitted by a network device, and detects, from the sequence, the explicit hybrid automatic repeat request (HARQ) corresponding to the PUSCH to obtain the detection result, where an explicit HARQ for each terminal corresponds to a transmission sequence that is subjected to cyclic shift.

The DCI includes: A bit information corresponding to the explicit HARQ of each terminal, and different states of the A bit information respectively indicate different explicit HARQ contents; or the DCI includes: indication information for performing PUSCH retransmission with a hybrid automatic repeat request identifier (HARQ ID) corresponding to the PUSCH, or for performing PUSCH retransmission with an optional hybrid automatic repeat request identifier (HARQ ID), in a case that the PUSCH retransmission is determined to be performed.

The transceiver 71 detecting the explicit hybrid automatic repeat request (HARQ) corresponding to the PUSCH includes: receiving, in a predetermined transmission time, the explicit HARQ that is transmitted to the terminal.

The predetermined transmission time includes: a time interval between a start moment and an end moment, where the start moment is a moment when the network device completes receiving all repeated transmissions of the PUSCH, the end moment is a moment when a timer expires, and the timer is started when the network device completes receiving all the repeated transmissions of the PUSCH; or the predetermined transmission time includes: a time interval between a start moment and an end moment, where the start moment is a moment when the network device completes receiving one repeated transmission of the PUSCH, the end moment is a moment when a timer expires, and the timer is started when the network device completes receiving all repeated transmissions of the PUSCH.

The transceiver 71 is configured to: receive a signaling; and determine, according to the signaling, whether to support a transmission of the explicit HARQ.

It should be noted that the terminal is a terminal corresponding to the method shown in FIG. 5, and all implementations in the embodiments of the method shown in FIG. 5 are applicable to the embodiments of the terminal, and the same technical effects can be achieved. The terminal may further include: a processor 72, a memory 73, and so on. The transceiver 71 and the processor 72 are communicatively connected through a bus interface, the transceiver 71 and the memory 73 are communicatively connected through a bus interface, and the memory 73 and the processor 72 may also be communicatively connected through a bus interface. The Functions of the processor 72 may be implemented by the transceiver 71, and functions of the transceiver 71 may also be implemented by the processor 72.

An embodiment of the present disclosure also provides a device for transmitting a hybrid automatic repeat request, including:

a transmitting and receiving module, configured to a physical uplink shared channel (PUSCH) in an uplink grant-free transmission occasion;

a processing module, configured to detect an explicit hybrid automatic repeat request (HARQ) corresponding to the PUSCH to obtain a detection result, where the detection result includes at least one of: an acknowledgement (ACK), a negative acknowledgement (NACK), or a discontinuous transmission (DTX); and the transmitting and receiving module is configured to determine whether to retransmit the PUSCH according to the detection result.

The device is a device corresponding to the method shown in FIG. 5, and all the implementation manners in the embodiments of the method shown in FIG. 5 are applicable to the embodiments of the device, and the same technical effects can also be achieved.

An embodiment of the present disclosure also provides a terminal, including: a processor, configured to perform the following functions: transmitting a physical uplink shared channel (PUSCH) in an uplink grant-free transmission occasion; detecting an explicit hybrid automatic repeat request (HARQ) corresponding to the PUSCH to obtain a detection result, where the detection result includes at least one of: an acknowledgement (ACK), a negative acknowledgement (NACK), or a discontinuous transmission (DTX); and determining whether to retransmit the PUSCH according to the detection result. The terminal is a terminal corresponding to the method shown in FIG. 5, and all the implementation manners in the embodiments of the method shown in FIG. 5 are applicable to the embodiments of the terminal, and the same technical effects can also be achieved.

An embodiment of the present disclosure also provides a computer storage medium, including instructions. When being executed on a computer, the instructions cause the computer to execute the method described in above FIG. 2 or FIG. 5.

In the above-mentioned embodiments of the present disclosure, by transmitting an explicit HARQ, a problem that HARQ feedback consumes a large amount of downlink control signaling resources can be solved, on the premise of solving the miss-detection.

Those skilled in the art may appreciate that the units and algorithm steps of the various examples described in conjunction with the embodiments according to the present disclosure can be implemented in the form of electronic hardware or a combination of computer software and electronic hardware. Whether these functions are performed in hardware or software depends on the specific application and design constraints of the solution. Those skilled in the art can use different methods to implement the described functions for each particular application, but such implementations should not be considered as going beyond the scope of the present disclosure.

Those skilled in the art can clearly understand that for convenience and clarification, operation procedures of the systems, devices and units described hereinabove may refer to the corresponding procedures in the method embodiments, and thus will not be particularly defined herein.

It should be understood that in the embodiments according to the present application, the disclosed apparatus and method may be implemented in other manners. For example, the apparatus embodiments described above are merely illustrative. For example, the division of the units is only a logical function division, and in practical implementation, there may be another manner of division. For example, multiple units or components may be combined or integrated into another system, or some features can be ignored or not implemented. In addition, the mutual coupling or direct coupling or communication connection shown or discussed may be implemented with some interfaces, and indirect coupling or communication connection between apparatuses or units may be electrical, mechanical or in other forms.

The units described as separate components may or may not be physically separated, and the components shown as units may or may not be physical units, that is, they may be located in one place or distributed to multiple network units. Some or all of the units may be selected according to practical needs to achieve the objective of the technical solutions of the embodiments.

In addition, functional units in various embodiments of the present disclosure may be integrated into one processing unit, or each unit may exist physically separately, or two or more units may be integrated into one unit.

In a case that the functions are implemented in the form of a software functional unit which is sold or used as a standalone product, the product may be stored in a computer-readable storage medium. Based on such understanding, the essence or the portion of the technical solutions of the present disclosure that contributes to the prior art may be embodied in the form of a software product. The computer software product is stored in a storage medium, which includes instructions that cause a computer device (which may be a personal computer, a server or a network device) to perform all or part of the steps of the methods according to the embodiments of the present disclosure. The foregoing storage medium may include any storage medium that can store program codes, such as a USB flash drive, a mobile hard disk, a ROM, a RAM, a magnetic disk, or an optical disk.

In addition, it should be noted that in the device and method of the present disclosure, obviously, each component or each step can be decomposed and/or recombined. These decomposition and/or recombination should be regarded as equivalent solutions of the present disclosure. In addition, the steps of performing the above series of processing can naturally be performed in a chronological order according to the description order, but it is not necessarily performed in a chronological order, and some steps can be performed in parallel or independently of each other. Those of ordinary skill in the art can understand that all or any of the steps or components of the method and device of the present disclosure can be used in any computing device (including a processor, a storage medium, etc.) or a network of a computing device, and can be implemented using hardware, firmware, software, or a combination thereof, which can be achieved by those of ordinary skill in the art based on their basic programming skills after reading the description of the present disclosure.

Therefore, the objective of the present disclosure can also be achieved by running a program or a group of programs on any computing device. The computing device may be a well-known and general-purpose device. Therefore, the objective of the present disclosure can also be achieved only by providing a program product containing a program code for implementing the method or device. That is, such a program product also constitutes the present disclosure, and a storage medium storing such a program product also constitutes the present disclosure. Obviously, the storage medium may be any well-known storage medium or any storage medium developed in the future. It should also be pointed out that in the device and method of the present disclosure, obviously, each component or each step can be decomposed and/or recombined. These decomposition and/or recombination should be regarded as equivalent solutions of the present disclosure. In addition, the steps of performing the above-mentioned series of processing can naturally be performed in chronological order in the description order, but do not necessarily need to be performed in chronological order. Some steps can be performed in parallel or independently of each other.

It can be understood that the embodiments described in the embodiments of the present disclosure can be implemented by hardware, software, firmware, middleware, microcode, or a combination thereof. For hardware implementation, the processing unit can be implemented in one or more application specific integrated circuits (Application Specific Integrated Circuits, ASIC), digital signal processing (Digital Signal Processing, DSP), digital signal processing device (DSP Device, DSPD), programmable logic device (Programmable Logic Device, PLD), field-programmable gate array (Field-Programmable Gate Array, FPGA), general-purpose processors, controllers, microcontrollers, microprocessors, other electronic units for performing the functions described in the present disclosure, or a combination thereof.

For software implementation, the technology described in the embodiments of the present disclosure can be implemented by modules (for example, procedures, functions, etc.) that perform the functions described in the embodiments of the present disclosure. Software codes may be stored in a memory and executed by a processor. The memory may be implemented in the processor or outside the processor.

The above embodiments are optional embodiments of the present disclosure. A person skilled in the art can make further modifications and improvements within technical principles of the present disclosure, and these modifications and improvements shall fall within the scope of the present disclosure.

What is claimed is:

1. A method for transmitting a hybrid automatic repeat request, applied to a network device, wherein the method comprises:
    receiving a physical uplink shared channel (PUSCH) in an uplink grant-free transmission occasion; and
    transmitting an explicit hybrid automatic repeat request (HARQ) according to a reception result of the PUSCH, wherein a content of the explicit hybrid automatic repeat request (HARQ) comprises at least one of: an acknowledgement (ACK), a negative acknowledgement (NACK), or a discontinuous transmission (DTX);
    wherein the transmitting the explicit hybrid automatic repeat request (HARQ) according to the reception result of the PUSCH comprises:
        when the PUSCH is received and correctly detected, transmitting the explicit HARQ, wherein the content of the explicit HARQ is the acknowledgement (ACK); and
        when the PUSCH is not received, or the PUSCH is received but incorrectly detected, not transmitting the explicit HARQ;
    or, wherein the transmitting the explicit hybrid automatic repeat request (HARQ) according to the reception result of the PUSCH comprises:
    when the PUSCH is received and correctly detected, transmitting the explicit HARQ, wherein the content of the explicit HARQ is the acknowledgement (ACK);
    when the PUSCH is not received, transmitting the explicit HARQ, wherein the content of the explicit HARQ is the discontinuous transmission (DTX); and
    when the PUSCH is received but incorrectly detected, not transmitting the explicit HARQ;
or
wherein the transmitting the explicit hybrid automatic repeat request (HARQ) according to the reception result of the PUSCH comprises:
    when the PUSCH is received and correctly detected, not transmitting the explicit HARQ; and
    when the PUSCH is not received, or the PUSCH is received but incorrectly detected, transmitting the explicit HARQ, wherein the content of the explicit HARQ is the negative acknowledgement (NACK);
or
wherein the transmitting the explicit hybrid automatic repeat request (HARQ) according to the reception result of the PUSCH comprises:
    when the PUSCH is received and correctly detected, not transmitting the explicit HARQ;
    when the PUSCH is received but incorrectly detected, transmitting the explicit HARQ, wherein the content of the explicit HARQ is the negative acknowledgement (NACK); and
    when the PUSCH is not received, transmitting the explicit HARQ, wherein the content of the explicit HARQ is the discontinuous transmission (DTX);
or
wherein the transmitting the explicit hybrid automatic repeat request (HARQ) according to the reception result of the PUSCH comprises:
    when the PUSCH is received and correctly detected, transmitting the explicit HARQ, wherein the content of the explicit HARQ is the acknowledgement (ACK);
    when the PUSCH is received but incorrectly detected, transmitting the explicit HARQ, wherein the content of the explicit HARQ is the negative acknowledgement (NACK); and
    when the PUSCH is not received, not transmitting the explicit HARQ;
wherein before receiving the physical uplink shared channel (PUSCH) in the uplink grant-free transmission occasion, the method further comprises:
    transmitting, to a terminal via a signaling, configuration information of whether to support transmission of the explicit HARQ, wherein the signaling comprises one of: a broadcast signaling, a higher-layer signaling, or a layer 1 control signaling.

2. The method for transmitting a hybrid automatic repeat request according to claim 1, wherein the transmitting the explicit HARQ comprises:
    transmitting an explicit HARQ for at least one terminal by using downlink control information (DCI); or
    transmitting an explicit HARQ for at least one terminal by using a sequence, wherein the explicit HARQ for each terminal corresponds to a transmission sequence that is subjected to cyclic shift.

3. The method for transmitting a hybrid automatic repeat request according to claim 2, wherein the DCI comprises: A bit information corresponding to the explicit HARQ of each terminal, and different states of the A bit information respectively indicate different explicit HARQ contents, A being an integer greater than or equal to 1; or
    the DCI comprises: indication information for performing PUSCH retransmission with a hybrid automatic repeat request identifier (HARQ ID) corresponding to the PUSCH, or for performing PUSCH retransmission with an optional hybrid automatic repeat request identifier (HARQ ID), in a case that the PUSCH retransmission is determined to be performed.

4. The method for transmitting a hybrid automatic repeat request according to claim 1, wherein the transmitting the explicit hybrid automatic repeat request (HARQ) comprises:
    transmitting an explicit HARQ for at least one terminal in a predetermined transmission time.

5. The method for transmitting a hybrid automatic repeat request according to claim 4, wherein:
    the predetermined transmission time comprises: a time interval between a start moment and an end moment, wherein the start moment is a moment when the network device completes receiving all repeated transmissions of the PUSCH, the end moment is a moment when a timer expires, and the timer is started when the network device completes receiving all the repeated transmissions of the PUSCH; or
    the predetermined transmission time comprises: a time interval between a start moment and an end moment, wherein the start moment is a moment when the network device completes receiving one repeated transmission of the PUSCH, the end moment is a moment when a timer expires, and the timer is started when the network device completes receiving all repeated transmissions of the PUSCH.

6. A method for transmitting a hybrid automatic repeat request, applied to a terminal, wherein the method comprises:
    transmitting a physical uplink shared channel (PUSCH) in an uplink grant-free transmission occasion;
    detecting an explicit hybrid automatic repeat request (HARQ) corresponding to the PUSCH to obtain a detection result, wherein the detection result comprises at least one of: an acknowledgement (ACK), a negative acknowledgement (NACK), or a discontinuous transmission (DTX); and
    determining whether to retransmit the PUSCH according to the detection result;
    wherein the determining whether to retransmit the PUSCH according to the detection result comprises:
        when the explicit HARQ is detected, and a content of the explicit HARQ is the ACK, not retransmitting the PUSCH; or
        when the explicit HARQ is not detected before a timer of the terminal expires, retransmitting the PUSCH with a hybrid automatic repeat request identifier (HARQ ID) corresponding to the PUSCH, or retransmitting the PUSCH with an optional hybrid automatic repeat request identifier (HARQ ID),
    or,
    wherein the determining whether to retransmit the PUSCH according to the detection result comprises:
        when the explicit HARQ is received, and a content of the explicit HARQ is the ACK, not retransmitting the PUSCH; or when the explicit HARQ is received, and a content of the explicit HARQ is the DTX, retransmitting the PUSCH with an optional hybrid automatic repeat request identifier (HARQ ID); or when the explicit HARQ is not detected before a timer of the terminal expires, retransmitting the PUSCH with a hybrid automatic repeat request identifier (HARQ ID) corresponding to the PUSCH, or retransmitting the PUSCH with an optional hybrid automatic repeat request identifier (HARQ ID), or, wherein the determining whether to retransmit the PUSCH according to the detection result comprises:

when the explicit HARQ is received, and a content of the explicit HARQ is the NACK, retransmitting the PUSCH with a hybrid automatic repeat request identifier (HARQ ID) corresponding to the PUSCH, or retransmitting the PUSCH with an optional hybrid automatic repeat request identifier (HARQ ID); or when the explicit HARQ is not detected before a timer of the terminal expires, not retransmitting the PUSCH, or, wherein the determining whether to retransmit the PUSCH according to the detection result comprises:

when the explicit HARQ is received, and a content of the explicit HARQ is the NACK, retransmitting the PUSCH with a hybrid automatic repeat request identifier (HARQ ID) corresponding to the PUSCH, or retransmitting the PUSCH with an optional hybrid automatic repeat request identifier (HARQ ID); or when the explicit HARQ is received, and a content of the explicit HARQ is the DTX, retransmitting the PUSCH with an optional hybrid automatic repeat request identifier (HARQ ID); or when the explicit HARQ is not detected before a timer of the terminal expires, not retransmitting the PUSCH, or, wherein the determining whether to retransmit the PUSCH according to the detection result comprises:

when the explicit HARQ is received, and a content of the explicit HARQ is the NACK, retransmitting the PUSCH with a hybrid automatic repeat request identifier (HARQ ID) corresponding to the PUSCH, or retransmitting the PUSCH with an optional hybrid automatic repeat request identifier (HARQ ID); or when the explicit HARQ is received, and a content of the explicit HARQ is the ACK, not retransmitting the PUSCH; or when the explicit HARQ is not detected before a timer of the terminal expires, retransmitting the PUSCH with an optional hybrid automatic repeat request identifier (HARQ ID);

wherein before the transmitting the physical uplink shared channel (PUSCH) in the uplink grant-free transmission occasion, the method further comprises:

receiving, from a network device via a signaling, configuration information of whether to support transmission of the explicit HARQ, wherein the signaling comprises one of: a broadcast signaling, a higher-layer signaling, or a layer 1 control signaling.

7. The method for transmitting a hybrid automatic repeat request according to claim 6, wherein the detecting the explicit hybrid automatic repeat request (HARQ) corresponding to the PUSCH to obtain the detection result comprises:

receiving downlink control information (DCI) transmitted by the network device, and detecting, from the DCI, the explicit hybrid automatic repeat request (HARQ) corresponding to the PUSCH to obtain the detection result; or receiving a sequence transmitted by the network device, and detecting, from the sequence, the explicit hybrid automatic repeat request (HARQ) corresponding to the PUSCH to obtain the detection result, wherein an explicit HARQ for each terminal corresponds to a transmission sequence that is subjected to cyclic shift.

8. The method for transmitting a hybrid automatic repeat request according to claim 7, wherein the DCI comprises: A bit information corresponding to the explicit HARQ of each terminal, and different states of the A bit information respectively indicate different explicit HARQ contents, A being an integer greater than or equal to 1; or the DCI comprises: indication information for performing PUSCH retransmission with a hybrid automatic repeat request identifier (HARQ ID) corresponding to the PUSCH, or for performing PUSCH retransmission with an optional hybrid automatic repeat request identifier (HARQ ID), in a case that the PUSCH retransmission is determined to be performed.

9. A network device, comprising:

a transceiver configured to receive a physical uplink shared channel (PUSCH) in an uplink grant-free transmission occasion; and transmit an explicit hybrid automatic repeat request (HARQ) according to a reception result of the PUSCH, wherein a content of the explicit hybrid automatic repeat request (HARQ) comprises at least one of: an acknowledgement (ACK), a negative acknowledgement (NACK), or a discontinuous transmission (DTX);

wherein when transmitting the HARQ according to the reception result of the PUSCH, the transceiver is specifically configured to execute following steps:

when the PUSCH is received and correctly detected, transmitting the explicit HARQ, wherein the content of the explicit HARQ is the acknowledgement (ACK); and when the PUSCH is not received, or the PUSCH is received but incorrectly detected, not transmitting the explicit HARQ, or when the PUSCH is received and correctly detected, transmitting the explicit HARQ, wherein the content of the explicit HARQ is the acknowledgement (ACK);

when the PUSCH is not received, transmitting the explicit HARQ, wherein the content of the explicit HARQ is the discontinuous transmission (DTX); and when the PUSCH is received but incorrectly detected, not transmitting the explicit HARQ, or, when the PUSCH is received and correctly detected, not transmitting the explicit HARQ; and when the PUSCH is not received, or the PUSCH is received but incorrectly detected, transmitting the explicit HARQ, wherein the content of the explicit HARQ is the negative acknowledgement (NACK), or, when the PUSCH is received and correctly detected, not transmitting the explicit HARQ;

when the PUSCH is received but incorrectly detected, transmitting the explicit HARQ, wherein the content of the explicit HARQ is the negative acknowledgement (NACK); and when the PUSCH is not received, transmitting the explicit HARQ, wherein the content of the explicit HARQ is the discontinuous transmission (DTX), or, when the PUSCH is received and correctly detected, transmitting the explicit HARQ, wherein the content of the explicit HARQ is the acknowledgement (ACK);

when the PUSCH is received but incorrectly detected, transmitting the explicit HARQ, wherein the content of the explicit HARQ is the negative acknowledgement (NACK); and when the PUSCH is not received, not transmitting the explicit HARQ;

wherein before receiving the physical uplink shared channel (PUSCH) in the uplink grant-free transmission occasion, the transceiver is further configured to:

transmit, to a terminal via a signaling, configuration information of whether to support transmission of the explicit HARQ, wherein the signaling comprises one of: a broadcast signaling, a higher-layer signaling, or a layer 1 control signaling.

10. A terminal, configured to execute the method according to claim 6, comprising:

a transceiver, configured to transmit a physical uplink shared channel (PUSCH) in an uplink grant-free transmission occasion; and a processor, configured to detect an explicit hybrid automatic repeat request (HARQ) corresponding to the PUSCH to obtain a detection result, wherein the detection result comprises at least one of: an acknowledgement (ACK), a negative acknowledgement (NACK), or a discontinuous transmission (DTX);

wherein the transceiver is configured to determine whether to retransmit the PUSCH according to the detection result.

* * * * *